(No Model.)
J. F. HAINES.
HOLDBACK FOR VEHICLES.
No. 502,718. Patented Aug. 8, 1893.
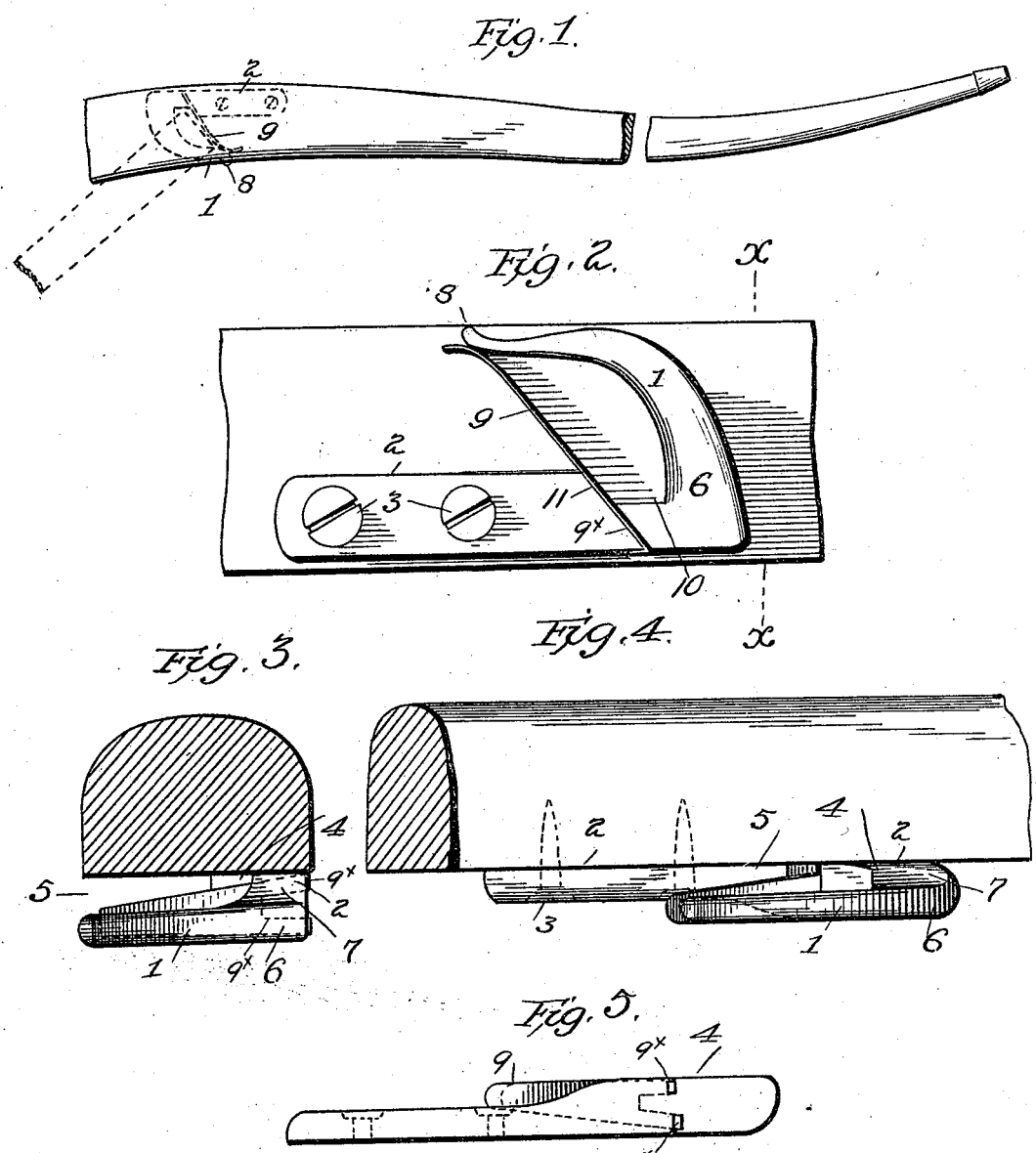

UNITED STATES PATENT OFFICE.

JOHN F. HAINES, OF RINGTOWN, PENNSYLVANIA.

HOLDBACK FOR VEHICLES.

SPECIFICATION forming part of Letters Patent No. 502,718, dated August 8, 1893.

Application filed April 14, 1893. Serial No. 470,334. (No model.)

*To all whom it may concern:*

Be it known that I, JOHN F. HAINES, a citizen of the United States of America, residing at Ringtown, in the county of Schuylkill and State of Pennsylvania, have invented certain new and useful Improvements in Holdbacks for Shafts or Thills, of which the following is a specification, reference being had therein to the accompanying drawings.

It is the object of my invention to provide a hook particularly adapted to act as a hold back and to be attached to the thills or to act as a holding or retaining hook in like situation. I have aimed to provide a hook of simple and economical construction in which the number of parts will be reduced to a minimum and in which the spring retainer is arranged to secure an automatic action in hooking and unhooking and further I desire to secure the spring retainer in place without the use of screws, rivets or the like.

In the drawings:—Figure 1, is a plan view of the thill with the hook shown in dotted lines on the under side. Fig. 2, is a bottom view of part of the thill with the hook in place. Fig. 3, is a cross section of Fig. 2, on line $x$—$x$, and Fig. 4, is an edge view of the thill being turned quarter way round from its normal position. Fig. 5 is a rear elevation of the hook.

The hook 1, is formed with a base plate 2 secured by screws 3, 3, to the thill. The hook is arranged at one end of the base plate and in order that the hook may lie alongside of the under face of the thill and at a sufficient distance therefrom to permit the passage of the hold back strap between it and the thill face, I form one end of the plate as at 4, about twice as thick as that portion through which the holding screws 3, 3, pass. This is fully shown in Figs. 4 and 5 the lower face being curved to connect the thick and main part of the base plate. The hook extends up from the outer or lower portion of the thickened end of the plate and a space 5 is thus left for the passage of the hold back strap. The shank 6 of the hook thus has a firm connection with the thick part of the base plate and this construction renders it unnecessary to offset the hook in relation to the base plate and prevents weakening of the hook at its point of connection with the plate. The shank of the hook gradually curves up or back to the upper or inner face of the base plate and this beveled part is shown at 7. The end of the hook curves over the base plate and toward the front of the thills its extreme front end being turned out at 8, and slightly flattened to form a bearing for the spring retainer 9 which consists of a spring plate which is inclined in relation to the base plate and slants backwardly from its bearing on the free end of the hook toward the shank thereof thus following the general direction of the shank, its free end being bent so that it forms with the end of the hook a pair of spreading jaws to permit the easy insertion of the hold back strap. The shank of the spring is bifurcated and the prongs $9^x$ enter slits formed in the opposite sides of the thick part of the plate and the outer projecting ends of these prongs are clinched on the base plate thus serving as the sole means of fastening the spring retainer in place and doing away entirely with all screws, rivets and other fastening devices. This fastening not only prevents the spring from pulling out, but prevents lateral displacement of the spring as the prongs have between them a solid part of the base plate. Further than this it will be seen that the plate is cut down at 10, and this forms a shoulder 11 against which the spring finds a bearing to stiffen it intermediate of its ends. It will be noticed that the spring is inclined in relation to the hook so that when the horse walks out of the thills, the hold back straps will slide along the inclined retainer and be automatically released. The form of the opening provided by the hook and the inclined spring is such as to receive the hold back loop properly and insure its being held in proper position to hold the vehicle back or to insure the automatic release when the horse walks out of the shafts. The general direction of the opening to receive the loop is at an inclination to the shaft and at a right angle to the direction in which the hold back strap extends as in Fig. 1.

As before stated the thickened shank of the hook has a firm connection with the thickened part of the plate and is not offset in relation to the lower face of said plate but is in the same plane therewith. This arrangement enables the hook to resist all strain to which it may be subjected.

The hook while particularly intended for hold back straps is not strictly limited to such use. By having the plates thickened at one end the hook may be arranged to lie at a slight distance from the face of the thill and yet the plate may bear on the thill from end to end as shown.

I claim—

1. In combination, the hook comprising the base plate and hook portion extending back over the same and the inclined spring retainer having its outer free end bearing on the end of the hook and inclining forward toward the base of the hook and secured to the base plate, substantially as described.

2. In combination, the hook comprising the base plate and hook portion having a thickened end with the hook thereon and a cut away part forming a shoulder, and the spring retainer bearing on said shoulder and having its lower end bifurcated and extending through slits in the plate, the ends of the prongs being clinched to the plate, substantially as described.

3. In combination, the hook comprising the base plate having the hook at one end and the spring retainer having a bifurcated end passing through the base plate and clinched thereto, substantially as described.

In testimony whereof I affix my signature in presence of two witnesses.

JNO. F. HAINES.

Witnesses:
F. L. MIDDLETON,
HENRY E. COOPER.